United States Patent [19]

Moore

[11] Patent Number: 4,915,597

[45] Date of Patent: Apr. 10, 1990

[54] FILTER PUMP HEAD ASSEMBLY IMPROVEMENTS

[75] Inventor: Scott E. Moore, Boise, Id.

[73] Assignee: Micron Technology, Inc., Boise, Id.

[21] Appl. No.: 286,854

[22] Filed: Dec. 19, 1988

[51] Int. Cl.[4] .............................................. F04B 43/02
[52] U.S. Cl. .................................... 417/313; 417/435; 417/479; 210/416.1
[58] Field of Search ....................... 417/435, 479, 313; 210/416.1, 416.2, 416.3, 416.4, 416.5

[56] References Cited

U.S. PATENT DOCUMENTS

| | | | |
|---|---|---|---|
| 2,818,029 | 12/1957 | Petzold | 417/435 |
| 4,276,004 | 6/1981 | Hahn | 417/479 |
| 4,690,621 | 9/1987 | Swain | 417/313 |

Primary Examiner—Leonard E. Smith
Attorney, Agent, or Firm—Jon P. Busack; Stan Protigal; Angus Fox

[57] ABSTRACT

Valve and channeling improvements in a filter pump head assembly used for dispensing photoresist in a semiconductor manufacturing facility. The improvements comprise sturdier construction, so that a supporting sheath is not necessary; single-tool assembly and disassembly; a conically tapered filter cavity, tapered bubble ring, and inlet orifice and vent orifice arrangement to maximize the assembly's venting ability; a modified filter cavity to accommodate a pleated membrane type higher throughput filter; a depression surrounding the outlet orifice to better ease fluid out of the filter chamber; placement of the bottom pneumatic control port at the side of the assembly rather than at the bottom, said bottom being shaped so that the assembly can stand upright unaided during operation; oval-shaped pneumatic valves to improve dispensing accuracy; visually marked fluid ports to avoid cross plumbing; a shutoff screw integrated into a vent valve, to reduce part count and for a cleaner design; an outlet valve fluid relief channel to encourage cleaner shutoff; and fittings to achieve fluid connection strain relief and threadless sealing.

4 Claims, 4 Drawing Sheets

FILTER PUMP HEAD ASSEMBLY IMPROVEMENTS

FIELD OF THE INVENTION

This invention relates to pneumatic diaphragm pumps such as used for photoresist dispensation in semiconductor manufacturing, and specifically to valve and channeling improvements in a named filter pump head assembly.

BACKGROUND OF THE INVENTION

A viscous fluid called photoresist is a crucial substance used in the manufacture of semiconductor circuits.

A photoresist dispenser or pump must be accurate, and must be reliable. A pump failure can not only waste expensive photoresist, but also destroy product by dispersing particles and bubbles into the photoresist and onto semiconductor wafers. Additionally, a pump that is easy to exchange and maintain is favored.

Specifically, the pump improved is that described in U.S. Pat. No. 4,690,621, to inventor Swain. Swain's pump is a pneumatic pump and filter combination. It invites several improvements which are objects of this invention.

SUMMARY OF THE INVENTION

One improvement is the making of the pump assembly sufficiently sturdy to render an outer casing or sheath unnecessary. This reduces the number of parts required to build the pump, thereby reducing initial and maintenance costs and improving reliability.

Another improvement is to design the pump so that only one tool is necessary for assembly and disassembly.

Another improvement is a conical tapering of the top of the pump's filter cavity to render said cavity incapable of holding gas bubbles.

Another improvement is a depression in the face of its filter interface to ease fluid flow out through the outlet orifice.

Another improvement is an enlargement of the filter cavity and modification of the filter interface to accommodate a larger, higher-flow filter, resulting in higher throughput.

Another improvement is the placement of a vent orifice at the highest elevation of the filter cavity, so that bubbles are urged to exit through said vent orifice.

Another improvement is the placement of an inlet orifice at a lower elevation than the vent orifice.

Another improvement is a bubble ring at the top of the conical taper, connecting the inlet orifice to the vent orifice, the upper surface of said bubble ring tapered so that bubbles located at any point within the bubble ring are urged to exit through the vent orifice.

Another improvement is the bottom pneumatic control protruding from the side of the bottom cap rather than the bottom surface of the cap, so the pump assembly can stand upright unaided. Special brackets to hold the assembly upright are then unnecessary.

Another improvement is the implementation of oval-shaped rather than circular-shaped valves to minimize residual fluid held in the valves, thereby reducing spurts, and to reduce voids which may be introduced into the fluid by a valve initially containing gas.

Another improvement is the visual marking of the ports to eliminate any possibility of cross-plumbing.

Another improvement is the integration of a shutoff device into the vent valve instead of a shutoff device in associated fluid connections, thereby reducing part count.

Another improvement is the addition of a fluid relief channel to the outlet valve to ensure that the valve's discharge hole seals first, thereby ensuring a clean shutoff of the valve and improving the dispensing accuracy of the pump.

Another improvement is fittings attaching pump to outside fluid connections for threadless sealing and strain relief.

Another improvement is the use of a pleated membrane type of filter rather than a stacked disk type of filter. The pleated membrane filter has no horizontal cavities to trap gas bubbles and therefore offers improved purging.

The present invention contains all of these improvements and accompanying advantages. The claimed improvements make a pump such as Swain's less expensive, more reliable, easier to exchange, and less costly to maintain.

Further, said pump with the claimed improvements has so few pieces, and such straightforward design, that even a patent agent using only an allen wrench took it apart and put it together again with little difficulty, the only damage of consequence being a hole punched through one of the diaphragms.

DETAILED DESCRIPTION OF THE PREFERRED EMBODIMENT

Figure 1:
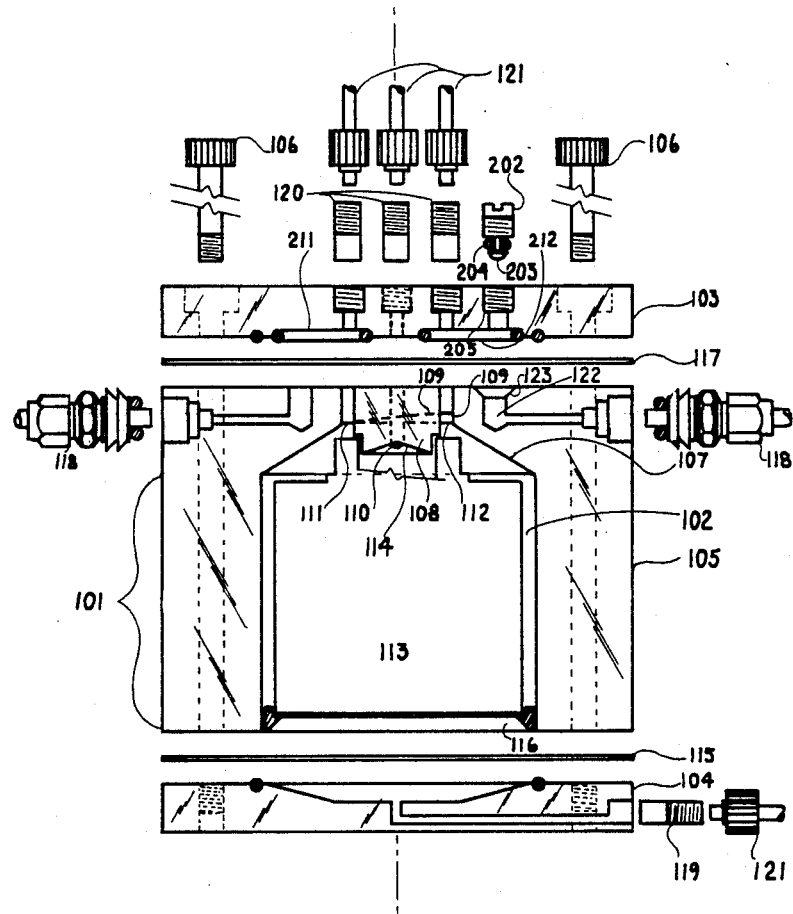
FIG. 1 depicts a top view of a pump constructed in accordance with the invention.
Figure 2:
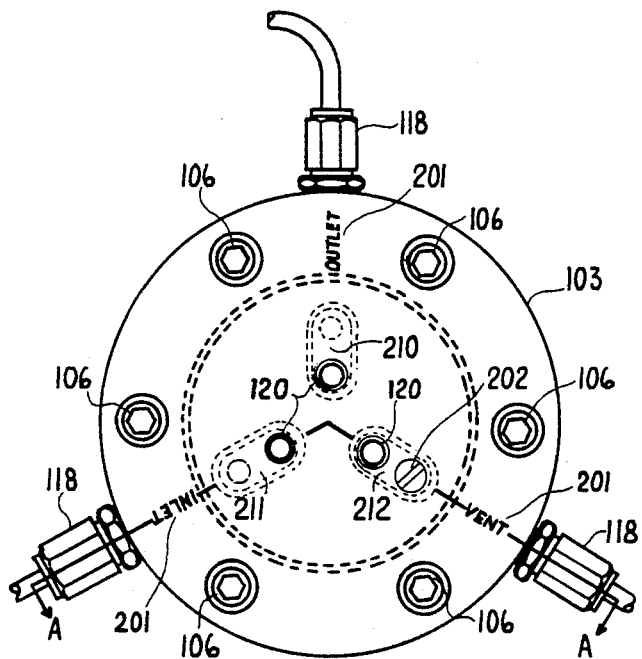
FIG. 2 depicts a cross-section of said pump along broken line A—A of FIG. 1.

In a preferred embodiment, as shown in FIGS. 1 and 2, a pump with claimed improvements has a substantially solid body 105. Walls 101 of a filter cavity 102 also provide structural support for the entire assembly, negating any need for external support pieces or sheathing. A hard anodized aluminum top cap 103 is attached to a hard anodized aluminum bottom cap 104 through a Teflon TM pump body 105 and Teflon TM diaphragms 117 and 115 via long bolts 106 dispersed radially around and within the assembly. The bolts 106 are similarly configured, and the holes in the bottom cap 104 are threaded, so that only one tool is necessary to dismantle the assembly. These bolts may be hand tightenable.

Pneumatic ports 119 and 120 are epoxied into the caps 103 and 104 for firm connection and seal. Pneumatic fittings 121 can then be snugly connected to the ports 119 and 120.

The filter cavity 102 has a conical taper 107, so that the cavity 102 is incapable of collecting bubbles. The top of the conical taper 107 does not come to a point, but is shaped into a filter interface 108 and a bubble ring 109. The filter interface 108 contains an outlet orifice 110, located in a depressed face 114 of the filter interface 108, which allows smoother fluid flow to the outlet orifice 110.

Clearly, to urge bubbles, said taper 107 is not limited to being conical. Conical tapering is simply convenient. Substantially conical tapers may be used, such as parabolic or pyramidal, and the taper may also be vertically corrugated (like a Ruffles potato chip), without stepping outside of the boundaries of the present claims.

The filter cavity 102 is of a large enough size to accommodate a larger, higher-flow filter 113. This offers higher throughput handling of higher viscosity liquids such as photoresist. A Pall TM pleated membrane filter was selected because it is less expensive, has higher throughput, and has better purging capabilities than the filter used by Swain. There was some question as to whether the pleated filter generates more particles, but no significant problem was found.

The bubble ring 109 contains an inlet orifice 111 and a vent orifice 112, an upper surface of the bubble ring 109 being tapered such that bubbles located at any point within the bubble ring 109 are urged to exit through the vent orifice 112.

The conical taper 107 and the bubble ring 109 are joined in such a way that any bubble rising in the filter cavity 102 is urged into the bubble ring 109 by the conical taper 107, and then urged by the bubble ring 109 taper to exit through the vent orifice 112. The conical taper 107 concentrically surrounds the bubble ring 109, which concentrically surrounds the filter interface 108.

A bottom pneumatic control port 119 exits through the side of the bottom cap 104, rather than the cap's bottom surface. This allows the pump assembly to stand upright unaided.

As shown in FIG. 2, valves 210, 211, and 212 are substantially oval-shaped rather than circular-shaped. This minimizes residual fluid capture within said valves 210, 211, and 212, and reduces chances of introducing a void into the pumped liquid if one of the valves 210, 211, or 212 starts out containing gas. Although an oval shape is used in the preferred embodiment, some other shape equivalent for the purpose (such as rectangular) might be used.

Markings 201 are placed on the upper surface of the top cap 103 to clearly identify the function of the ports corresponding to each valve 210, 211, and 212, the functions being outlet, inlet, and vent, respectively.

As shown in FIGS. 1 and 2, the vent valve 212 has a shutoff screw 202 integrated into its design. The shutoff screw 202 is held in place to provide adjustable force to the top of a valve diaphragm 117. The shutoff screw 202, when loosened, allows the valve diaphragm 117 freedom for movement, meaning the valve 212 can be opened and closed pneumatically. The shutoff screw 202, when tightened, limits or stops valve diaphragm 117 movement, effectively limiting flow or shutting off the valve 212. This shutoff function is facilitated by locating the screw 202 directly over an outlet 122 of the valve 212.

The shutoff screw 202 has a rounded end 203 to prevent damage to the valve diaphragm 117, and an o-ring 204 to hold the screw 202 snugly, and to provide a seal between the shutoff screw 202 hole and the shutoff screw 202. The screw 202 hole has a thread stop 205 to prevent the screw 202 from being tightened too much and damaging the valve diaphragm 117. The valve 212 outlet has a bevel so that the diaphragm 117 is not damaged when pinched between the screw end 203 and the vent outlet 122.

Figure 3:
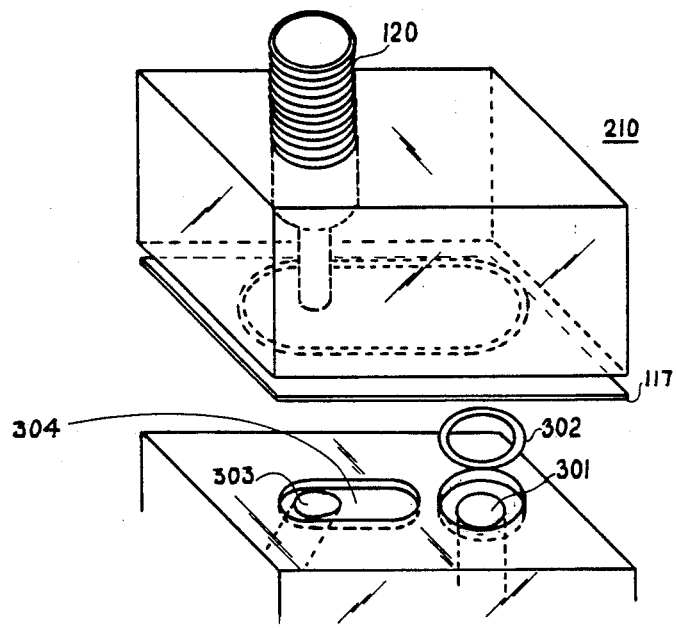
FIG. 3 details an outlet valve of said pump.

As detailed in FIG. 3, the outlet valve 210 contains an outlet hole 301, with an o-ring 302, and an inlet hole 303. The inlet hole 303 conveys fluid from the outlet orifice 110 of the filter interface 108. The outlet hole 301 conveys fluid out of the pump. Surrounding the inlet hole 303 is a recess 304, called a fluid relief channel. The area of the fluid relief channel 304 is larger than the area of the outlet hole 301. This, combined with the slightly raised surface of the o-ring 302, has the effect of causing the outlet hole 301 to seal before the inlet hole 303 as the valve 210 closes, causing any residual fluid in the valve 210 to be forced back into the pump through the inlet hole 303 instead of spurting out the outlet hole 301. The result is clean outlet valve 210 shutoff, and improved dispensing accuracy of the pump.

Figure 4:
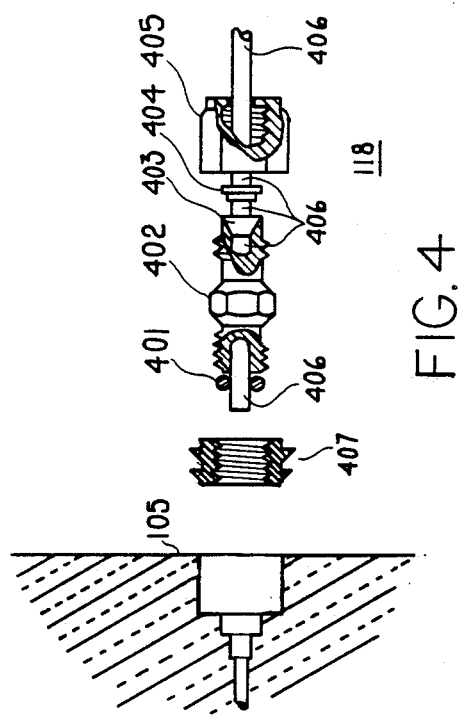
FIG. 4 details a fitting used with said pump.

A fitting 118, as shown in FIGS. 2 and 4, comprises an o-ring 401, a center piece 402, a first compression bushing 403, a second compression bushing 404, and a compression nut 405, all of which have a center diameter sized to fit snugly around a Teflon TM tube 406, and all of which are made of Teflon TM. The fitting 118 attaches to the pump body 105 via a hard anodized aluminum bushing 407, threaded on the inside, configured to be press fitted into the pump body 105. In use, the o-ring 401 and center piece 402 are installed into the pump body 105 via the bushing 407. The tube 406 is pushed into the center piece 402 until the tube 406 end snugs up against the pump body 105, the o-ring 401 forming a threadless seal between the pump body 105 and the tube 406. The tube 406 is then secured in place by the compression nut 405 being tightened against the compression bushings 403 and 404, holding the tube 406 in place.

It should be noted that pumped fluid contacts only inert surfaces while within the pump. All o-rings also in contact with the fluid are chemically compatible with the pumped fluid to avoid o-ring swelling or disintegration.

What is claimed:

1. Improvements in a pneumatic filter pump head assembly, which includes pneumatically controlled diaphragm valves, a body, a filter cavity within said body, a filter, a top cap, a bottom cap, a plurality of fluid ports, a plurality of pneumatic control ports, and valves located where said body interfaces with said top cap, said fluid ports in communication with said valves, said control ports in communication with said diaphragm valves, so that when pneumatic pressure to said control ports is varied, fluid can be pumped from one fluid port to another fluid port through said filter, said improvement comprising:
    (a) said body and diaphragms being made of chemically inert material;
    (b) said filter cavity's highest elevation being formed into a filter interface and a bubble channel;
    (c) said filter cavity being tapered from a second elevation to the bubble channel, said second elevation being lower than said bubble channel, said taper being continuously joined to said bubble channel, so that a bubble in the filter cavity will be urged by the taper to enter the bubble channel;
    (d) said bubble channel containing an inlet orifice and a vent orifice, and being tapered such that a bubble located at any point within the bubble channel will be urged to exit through the vent orifice, said vent orifice being at the highest elevation of the bubble channel;
    (e) fittings attaching outside fluid connections to pump fluid ports, each fitting providing a seal between said fluid connection and a fluid port;
    (f) said body, top cap, and bottom cap being substantially solid and self supporting when assembly is operating, so that outer sheathing is unnecessary, said top cap joined to the top of the body, and said bottom cap being joined to the bottom of the body;

(g) said filter interface having an outlet orifice and a depression surrounding the outlet orifice for smoother fluid flow;

(l) said valves being substantially oval shaped, to minimize volume of fluid or gas containable in said valves;

(i) a shutoff device integrated into one or more of the valves;

(j) an output valve having an outlet hole, an inlet hole, and a fluid relief channel surrounding the inlet hole, said channel of greater area than the outlet hole of said valve, to assist the outlet hole to close first while the valve is shutting off, to provide clean valve shutoff action;

(k) said outlet hole having a surrounding o-ring with an upper surface slightly higher than the bottom surface of the valve to further assist said outlet hole closing; and (l) each fitting providing a threadless seal and strain relief between said fluid connection and a fluid port, each fitting interfacing into a bushing which interfaces into a respective port.

2. Improvements of claim 1, further comprising:

(a) said shutoff device comprising a screw that when turned to a first position does not affect valve diaphragm freedom of movement, and when turned to a second position limits valve diaphragm freedom of movement, and when turned to a third position disables valve diaphragm freedom of movement, said first position thereby allowing maximum flow through said valve, said second position thereby limiting flow through said valve, and said third position thereby shutting off flow through said valve;

(b) said shutoff device having a thread stop to prevent the screw from overtightening and consequently damaging the valve diaphragm;

(c) said top cap and said bottom cap joined to said body by a plurality of similarly configured fasteners, so that only one tool is necessary to dismantle and build the assembly;

(d) said filter cavity taper being substantially conical;

(e) said bubble channel being substantially ring shaped; and (f) said filter cavity concentrically surrounding said bubble channel, said channel concentrically surrounding the filter interface.

3. Improvements of claim 2, further comprising:

(a) said body and diaphragms being made of Teflon TM;

(b) said top cap, said bottom cap, and said bushings being made of hard anodized aluminum;

(c) said top cap and said bottom cap being joined to and through said body;

(d) said shutoff screw having a rounded end to avoid damage to the valve diaphragm, and a surrounding o-ring to provide a seal between the shutoff screw and the shutoff screw hole, being located over an outlet hole of the valve;

(e) said outlet hole having a bevel to prevent damage to the diaphragm when it is pinched between the screw and said hole; and (f) said filter being a pleated membrane filter.

4. Improvements of claim 3, further comprising:

(a) said dismantling and building tool being a hand;

(b) said fluid ports each being marked according to function; and (c) a bottom pneumatic control port protruding from a side of the bottom cap, said bottom cap having a bottom surface shaped such that the assembled filter pump head assembly can stand upright unaided.

* * * * *